United States Patent [19]
Howard

[11] 3,856,362
[45] Dec. 24, 1974

[54] ELECTRONICALLY CONTROLLED SOLENOID REGULATED SERVOMOTOR

[75] Inventor: Donald W. Howard, South Bend, Ind.

[73] Assignee: The Bendix Corporation, South Bend, Ind.

[22] Filed: May 31, 1973

[21] Appl. No.: 365,798

[52] U.S. Cl. .......................... 303/7, 60/545, 91/32, 303/20
[51] Int. Cl. .............................................. B60t 13/74
[58] Field of Search ...................... 60/545; 91/32; 180/103–104; 188/3 R, 112, 195; 303/3, 7, 15, 20, 22 R

[56] References Cited
UNITED STATES PATENTS

| | | | |
|---|---|---|---|
| 3,041,114 | 6/1962 | Stelzer | 303/7 |
| 3,232,674 | 2/1966 | Stelzer | 303/7 |
| 3,507,542 | 4/1970 | Cannella | 303/7 |
| 3,574,414 | 4/1971 | Jacob | 303/7 |
| 3,758,165 | 9/1973 | Savelli | 303/20 |
| 3,771,838 | 11/1973 | Rossigno et al. | 303/7 |
| 3,780,832 | 12/1973 | Marshall | 188/3 R |

FOREIGN PATENTS OR APPLICATIONS

| | | | |
|---|---|---|---|
| 2,024,406 | 12/1970 | Germany | 188/112 |

*Primary Examiner*—Trygve M. Blix
*Assistant Examiner*—Stephen G. Kunin
*Attorney, Agent, or Firm*—Leo H. McCormick, Jr.; William N. Antonis

[57] ABSTRACT

An electrical circuit for operating a solenoid controlled servomotor which supplies an operational fluid under pressure to the wheel brakes of a trailer in response to an actuation signal which is transmitted to the wheel brakes of a tow vehicle.

6 Claims, 5 Drawing Figures

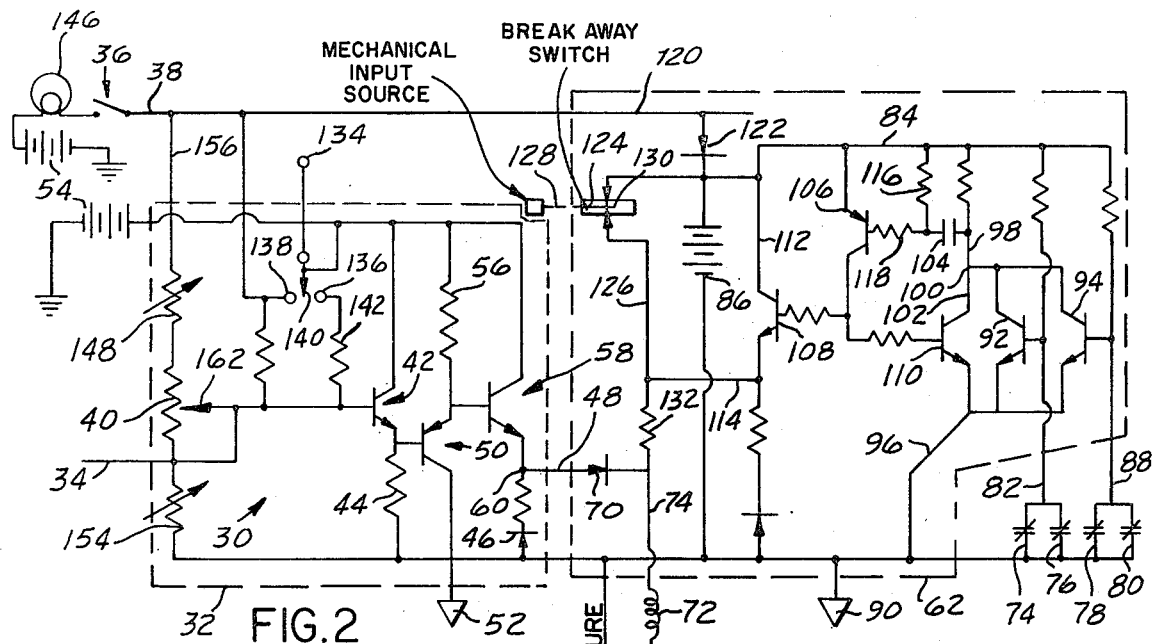
FIG.2
FIG.3
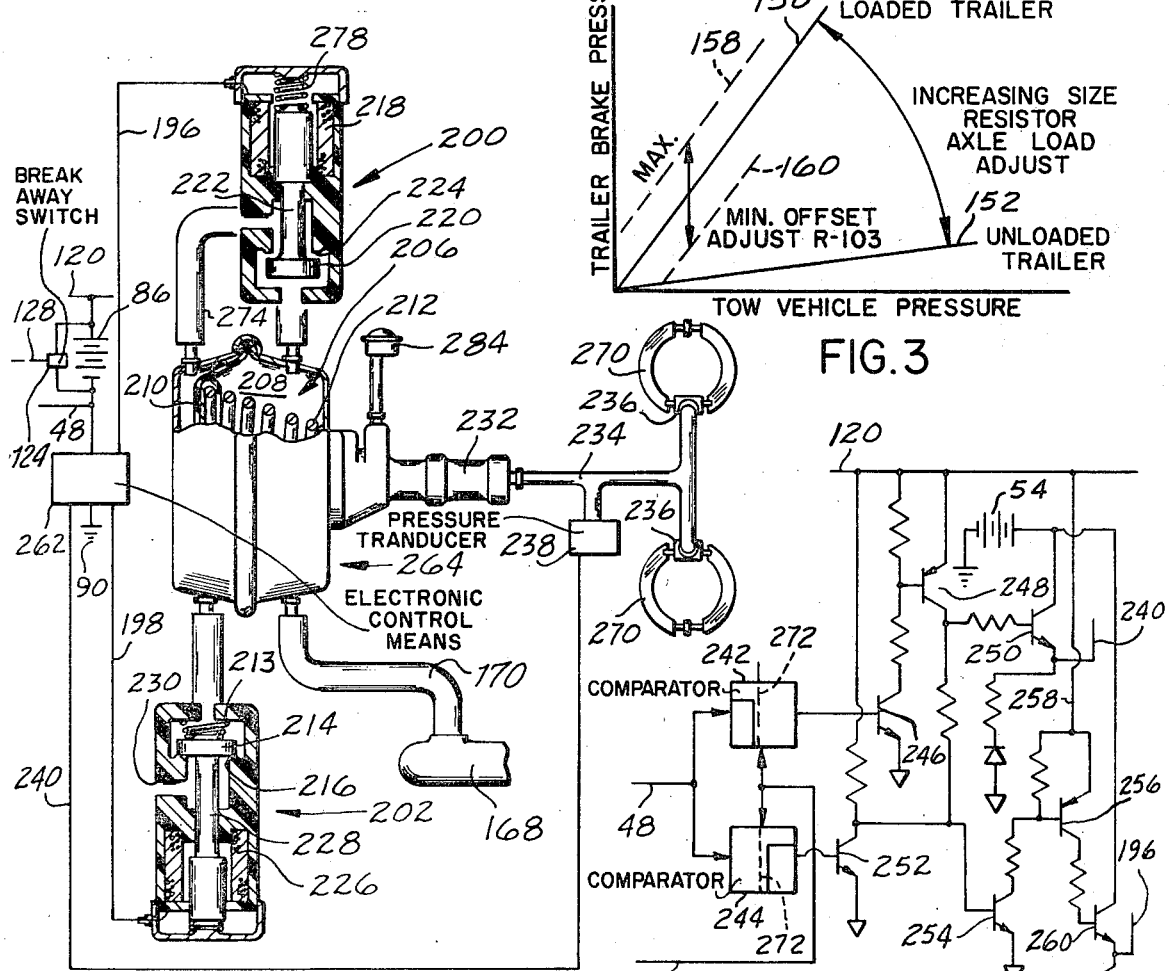
FIG.4
FIG.5

ELECTRONICALLY CONTROLLED SOLENOID REGULATED SERVOMOTOR

BACKGROUND OF THE INVENTION

Recreational trailers, house trailers and small cargo trailers are being purchased by many people and constantly moved, usually by the family automobile, over roads having various surfaces. Many types of brakes that are used on trailers are electrically actuated. However, the output of an electrical brake is limited by the pulling force of the solenoid which moves a brake pad into engagement with a corresponding member. Consequently, the wheel brakes of the tow vehicle must compensate for this deficiency in the wheel brakes of the trailer.

In copending U.S. Application Ser. No. 267,294 and now U.S. Pat. No. 3,771,838 incorporated herein by reference, a hydraulic control device is disclosed to provide synchronization between the actuation of the wheel brakes of a tow vehicle and the wheel brakes of a trailer. In this system an electrical delay current initiated by the brake light switch activates a solenoid switch to allow air to flow into a power chamber and develop a pressure differential across a wall. Thereafter, a proportioned pressure signal derived from the actuation fluid of the rear wheels of the tow vehicle will supply the operational signal to a control valve on a servomotor in the trailer.

SUMMARY OF THE INVENTION

I have devised an electrical control means for regulating the actuation of a servomotor for the wheel brakes of a trailer in synchronization with the wheel brakes of a tow vehicle. A first transducer means converts an actuation force transmitted to the wheel brakes of the tow vehicle into an electrical actuation signal for a solenoid controlled valve means of the servomotor. The electrical actuation signal is modified by a mass sensing signal and an adjustable means for altering the effective operating range with set time limits to provide optimum braking between the tow vehicle and the trailer. The solenoid controlled valve means has a source of electrical energy to operate the servomotor on the trailer independently of the tow vehicle if contact therebetween is interrupted. This source of electrical energy is connected to a plurality of sensors located on opposing sides of the trailer to moniter sway generated therein and automatically produce an actuation signal to activate the solenoid controlled valve means. With the solenoid controlled valve actuated, a braking force will be produced in the trailer. This braking force will provide resistance to the forward motion produced by the tow vehicle and thereby straighten the trailer/tow vehicle alignment. Similarly, a snub control means manually operated by the operator can reinforce the actuation signal derived by the sensors in addition to providing individual actuation of the wheel brakes of the trailer independently of the tow vehicle. The operator, in the event that the tow vehicle trailer is stopped, can manually activate a parking brake control to operate the solenoid valve means and create an operational force sufficient to activate the wheel brakes on the trailer. A break away switch between the tow vehicle and the trailer upon separation thereof will allow electrical energy from a source in the trailer to activate the solenoid valve means and automatically activate the wheel brakes of the trailer.

It is therefore the object of this invention to provide an electrically operated servomotor in a trailer responsive to a control signal derived from a sensed condition in a tow vehicle with circuit means for synchronizing the actuation of the wheel brakes of the trailer with the wheel brakes of the tow vehicle.

It is another object of this invention to provide a tow vehicle-trailer braking system with an electronic control to regulate the actuation of the wheel brakes of the trailer.

It is a further object of this invention to provide an electronic control for a solenoid regulated valve in a servomotor with comparator means responsive to sensed conditions for supplying an actuation command to activate the wheel brakes of a trailer.

These and other objects will become apparent from reading this specification and viewing the drawings.

BRIEF DESCRIPTION OF THE DRAWINGS

FIG. 2 is a schematic of the electrical control circuit located in the tow vehicle-trailer system of FIG. 1.

FIG. 3 is a graph showing the relationship of the wheel brake pressure in the tow vehicle with respect to various loads in the trailer.

FIG. 4 is a schematic of another solenoid controlled servomotor for use in a trailer.

FIG. 5 is a schematic of the electrical control circuit of the solenoid in FIG. 4.

DETAILED DESCRIPTION OF THE PREFERRED EMBODIMENT

Figure 1:
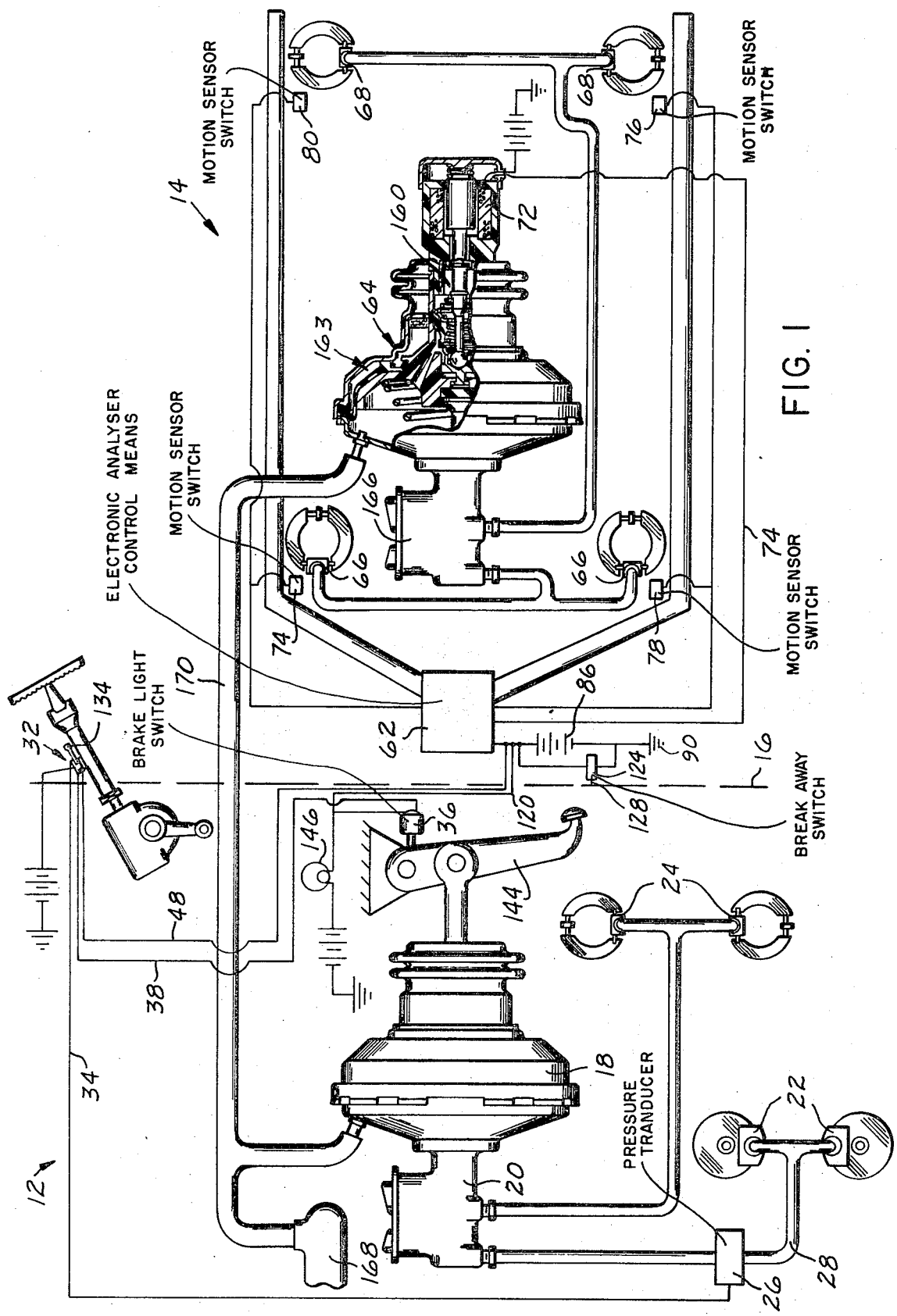
FIG. 1 is a schematic of a tow vehicle-trailer braking system.

In the embodiment shown in FIG. 1, a tow vehicle 12 is joined to a trailer 14 by a conventional hitch illustrated by line 16. The tow vehicle 12 has a servomotor 18, of a type fully described in U.S. Pat. No. 3,106,873 and incorporated herein by reference, attached to a master cylinder 20, of a type fully described in U.S. Application Ser. No. 204,550 and now U.S. Pat. No. 3,818,706 and incorporated herein by reference, for supplying the front wheel brakes 22 and the rear wheel brakes 24 with pressurized fluid during a brake application. A transducer means 26 located in conduit 28 converts the pressure of the hydraulic fluid supplied to the front wheels 22 into a corresponding electrical signal which is transmitted into the control sector 30, see FIG. 2, of the manual control means 32 through lead 34. The manual control means 32 is connected to the brake light switch 36 through lead 38.

The control sector 32 of the manual control means 134 includes a first variable resistor 40 responsive to the electrical signal on lead 34. The electrical signal on lead 34 will switch the NPN transistor 42 into a conducting condition and supplies an actuation signal through resistor 44 on lead 48 to the trailer 14. When the NPN transistor 42 is transmitting, PNP transistor 50 connected to ground 52 will be switched on allowing an electrical potential from the battery 54 to pass through resistor 56 and switch ON transistor 58. The output of transistor 58 is communicated through lead 48 and diode 70 to the control means 62 of the trailer 14.

The control means 62 is connected to a servomotor means 64, fully described and incorporated herein in copending U.S. Application Ser. No. 261,873, and now U.S. Pat. No. 3,800,666 which supplies the front wheel brakes 66 and the rear wheel brakes 68 with hydraulic fluid under pressure during a brake actuation. The actuation signal, as represented by the output from transistor 58, will pass through diode 70 before being communicated to coil 72 through lead 74.

The control means 62 is connected to a plurality of sensors 74, 76, 78 and 80 on opposite sides of the trailer 14. Sensors 74, 76, 78 and 80 are normally closed switches, such as mercury switches. Sensors 74 and 76 are connected in parallel through lead 82 and 84 to battery 86. Similarly sensors 78 and 80 are connected in parallel through lead 88 and 84 to battery 86. Upon either sensors 74 and 76 or sensors 78 and 80 opening simultaneously electrical continuity between lead 84 and ground 90 will be interrupted raising the electrical potential on the bases of transistor 92 and transistor 94, respectively. Upon the base of either transistor 92 or transistor 94 being raised electrical current will flow therethrough from lead 98 to ground 90 on lead 96. With current flowing through lead 96, the electrical potential on lead 102 away from junction 100 will approach zero or ground potential. Simultaneously, timing capacitor 104 will switch transistor 106 on to allow electrical current to flow to the base of transistors 108 and 110. With the base of transistor receiving electrical current, electrical energy will flow from lead 112 through lead 114 to connecting lead 74 into the coil 72 of the servomotor means 64. With coil 72 energized, an actuation force will be developed which will provide the wheel brakes 66 and 68 with a braking potential to offer resistance to the motion of the tow vehicle 12. The time duration of the pulse is determined by the size of resistor 116 as compared to resistor 118 and the charging capacity of capacitor 104. This time can vary from 0.1 to 1.0 seconds depending upon the mechanical lag of the components in the trailer 14 as determined from actual test.

The battery 86 is maintained in fully charged condition by electrical current flowing in lead 120 from brake light switch 36 during each brake application. Diode 122 will prevent shorting of the battery 86 if the lead 120 would happen to contact the body of the trailer 14.

A break away switch 124 has a nonelectrical conductive material 130 located between a pair of contacts to prevent electrical current from being communicated through lead 126 while the tow vehicle 12 and trailer 14 are joined together. A connection 128 is attached to the tow vehicle 12 and upon separation with the trailer will pull the material 130 away from the contacts to allow electrical energy to flow from the battery past control resistor 132 through lead 74 into the coil 72. Again with coil 72 energized, a braking force will be supplied to the wheel brakes 66 and 68 of the trailer independently of any action by the operator of the tow vehicle 12.

Additionally the operator can independently operate the wheel brakes 66 and 68 of the trailer 14 from the wheel brakes 22 and 24 of the tow vehicle 12 by manually moving knob 134 of the control means into snub position 136 or a park position 138. In the snub position an electrical actuation signal is generated by contact 140 completing an electrical circuit of battery 54 through resistor 142 to the base of transistor 42 to permit electrical current to flow from the emitter thereof to switch ON transistor 50 and allow transistor 58 to switch ON and supply an actuation signal to coil 72 of the solenoid operated servomotor 64. In the park position, the knob 134 is moved into a detent to hold contact 140 securely against contact 138 to continually supply an electrical signal to switch transistor 42 ON and supply coil 72 with an energizing force as described above.

MODE OF OPERATION OF THE PREFERRED EMBODIMENT

When the tow vehicle-trailer are moving and the operator wishes to stop, an input force is applied to the foot pedal 144 which will actuate the servomotor 18 to energize the master cylinder 20. With master cylinder 20 energized, hydraulic fluid under pressure will be supplied to the front wheel brakes 22 and the rear wheel brakes 24. Immediately upon moving the foot pedal 144, the brake light switch will allow electrical current to flow from the battery 54 into the stop light 146 system on the tow vehicle-trailer combination. This current flow in the brake light system will trickle through diode 122 into battery 86 to maintain the electrical potential therein at a predetermined level. As the pressure in the line 28 builds up, transducer means 26 will supply a corresponding electrical signal to the variable resistor 40 through lead 34. The variable resistor 40 is modified by adjustable resistor 148 to account for changes in the load carried by the trailer. In FIG. 3 the area between lines 150 and 152 illustrates the range that the signal from the transducer can be modified to achieve optimum braking between the tow vehicle and the trailer. Similarly adjustable resistor 154 can be modified to account for mechanical linkage conditions to either intensify or diminish the electrical signal from the transducer means 26. The adjustable resistor 154 will allow electrical current to flow from the battery through lead 156 upon the brake light switch 36 being closed to develop an initial electrical signal which can energize the coil 72 of the solenoid operated servomotor. The offset will determine the initial value of tow vehicle hydraulic pressure which will be required to activate the wheel brakes in the trailer 14. The offset can be varied between limit lines 158 and 160 as shown in FIG. 3. As described in the description of the various elements in the control means 30, upon the electrical signal being received at wiper 162 of the variable resistor 40, an electrical actuation signal will switch ON transistor 42 which in turn will switch transistor 50 ON which in turn will switch transistor 58 ON to modify the output of transistor 42 as presented at junction 60. The actuation signal communicated from junction 60 on lead 48 will energize the coil 72 in the servomotor 64. With coil 72 energized, the valve means 160 will allow a pressure differential to be created across wall means 163. This pressure differential will pressurize fluid in the master cylinder 166 to operate the wheel brakes 66 and 68 of the trailer. The electronic control system as shown in FIG. 2 will bring the actuation of the wheel brakes of the trailer in synchronization with the wheel brakes of the tow vehicle and provide optimum deceleration during a brake application.

The embodiment of the brake system for the trailer 14 shown in FIG. 4 wherein like elements are utilized with that of FIG. 1 will be identified with the same reference numeral. The solenoid operated servomotor 264 has a first solenoid valve means 200 and a second solenoid valve means 202 for controlling the creation of a pressure differential across a movable wall 206 in a power chamber of the servomotor in response to a signal from the control means 262. The first solenoid valve means 200 is normally opened to allow uninterrupted communication between the front chamber 208 and the rear chamber 210. This will allow vacuum which is communicated to the front chamber 208 from the intake manifold 168 of the tow vehicle through conduit 170 to permit vacuum to evacuate air from the servomotor 264 and allow resilient means 212 to position the wall means 206 toward the rear chamber 210. The second solenoid valve means 202 is normally closed since spring 212 will urge poppet 214 against seat 216. Upon an actuation signal being communicated through lead 128 to the electronic control means 262, a first signal is transmitted on lead 196 to the first solenoid valve means 200 to energize coil 218 and move the poppet 220 on plunger 222 against seat 224 and interrupt the communication between the front chamber 208 and the rear chamber 210. Sequentially a second signal is transmitted on lead 198 to energize the coil 226 of the second solenoid valve means 202. With the coil 226 energized, plunger 228 will move to overcome spring 212 and allow air to enter the rear chamber 210 through port 230. With air in the rear chamber 210 and vacuum in the front chamber 208, a pressure differential will be created across the wall means 206. This pressure differential will move the wall means to pressurize hydraulic fluid in the slave cylinder means 232. This pressurized hydraulic fluid will be transmitted through conduit 234 to the wheel brakes 236 on the trailer. A pressure transducer means 238 located in conduit 234 will convert the hydraulic fluid pressure into an equivalent electrical signal which is fed back to the electronic control means 262 through lead 240 to modify the first and second signals. With the first and second signal modified, the synchronization in actuation of the wheel brakes of the tow vehicle and trailer can be achieved to provide optimum deceleration during a brake application.

The electronic control means 262 includes a first comparator 242 and a second comparator 244 responsive to an actuation signal $P_l$ transmitted on lead 48 from the tow vehicle 12 and a trailer braking signal $P_t$ relayed from transducer 238 on lead 240. The first comparator 242 is connected to a control transistor 246 which is turned ON by the actuation signal $P_l$. When the control transistor 246 receives the actuation signal $P_l$, transistor 248 will be switched ON to allow the same current signal transmitted to the brake light to simultaneously change the electrical potential on the base of the power transistor 250 and the switching transistor 254. With electrical current on the base of the power transistor 250, electrical energy from the battery 54 will be transmitted on lead 240 to energize the coil 226 and move poppet 214 away from seat 216 to initiate the transmission of air at atmospheric pressure into the rear chamber 210. The electrical current on the switching transistor 254 will allow electrical current from the brake light to change the electrical potential on the base of transistor 256 to switch the base of the power transistor 260 from positive to negative and allow electrical energy from the battery 54 to be carried on lead 196 to the coil 218 and move the poppet 220 against the seat 224 of the normally opened solenoid valve 200. With air at atmospheric pressure in the rear chamber 210 and vacuum in the front chamber 208, a pressure differential will be created across wall means 206 which will overcome spring 212 and pressurize hydraulic fluid in the slave cylinder 232. This pressurized hydraulic fluid will supply the wheel cylinders 236 with an actuation force which will move the brake shoes 270 against drums (not shown) to provide braking for the trailer 14. Simultaneously with the build-up of pressure in the slave cylinder 232 the transducer 238 will relay a corresponding signal $P_t$ to the second comparator means 244 on lead 240. When $P_l$ is equal to $P_t$, as illustrated by a distance on either side of dashed line 272 in the switching cycles of the comparators 242 and 244, the output of the comparator 242 will terminate to switch the transistor 246 OFF and correspondingly interrupt the signal carried on lead 240 going to the coil 226 of air control solenoid 202. When the actuation signal to coil 226 is interrupted, spring 213 will urge poppet 214 against seat 216 to prevent any additional air from entering the rear chamber 210 and the intensity of the pressure differential across wall 206 will remain relatively stable. During the period when $P_l$ is equal to $P_t$, the operational signal from the brake light switch will be sufficient to maintain transistor 256 in the ON position to sustain the electrical energy transmission from battery 54 to coil 218. With coil 218 continually energized the flow path in conduit 274 between the front chamber 208 and the rear chamber 210 will remain closed.

Upon reducing some of the force on the brake pedal the value of $P_l$ will correspondingly be reduced to produce a position in the comparators where $P_l < P_t$. In this situation a signal from comparator 241 will cause the control transistor 252 to switch ON and change the potential across the base of transistor 254. This changing of the electrical potential of transistor 254 will allow the electrical energy from the brake light switch in lead 258 to by-pass transistor 260. With transistor 260 in the OFF position, the plunger 222 will move in response to spring 278 to allow air from the rear chamber 210 to flow into the front chamber and thereby reduce the pressure differential. Transistor 252 will remain ON as long as $P_t > P_l$; however, upon reaching an equilibrium, a hold condition will again prevail.

Upon release of the brake pedal 144, the operational signal to the brake lights will be interrupted and the base of transistor 256 will not respond to the output from the comparator 244. Consequently, the coil 218 will be de-energized and air will travel from the rear chamber 210 into the front chamber to be evacuated by the manifold connection 170. With the front and rear chambers at equilibrium, spring 212 will move wall 206 toward the rear chamber 210 permitting the release of any pressurizing fluid in conduit 234 into reservoir 284.

The following table illustrates the various operational conditions the comparators 242 and 244 evaluate in providing solenoid valves 200 and 202 with an operational command:

| Function | | Comparator 242 | Comparator 244 | Solenoid 200 | Valve 202 | OUTPUT from Slave Cylinder 232 |
|---|---|---|---|---|---|---|
| Trailer Brakes | $P_t = 0$ | 0 | 0 | 0 | 0 | No $P_t$ |
| | $P_t < P_l$ | 1 | 0 | 1 | 1 | Inc. $P_t$ during braking |
| | $P_t = P_l$ | 0 | 0 | 1 | 0 | Hold |
| | $P_t > P_l$ | 0 | 1 | 0 | 0 | Dec. Releasing | where
$P_t$ = Trailer brake line pressure
$P_c$ = Tow vehicle output signal

Thus, this embodiment will provide a solenoid controlled servomotor which can readily be adjusted to various size trailers 14 by sizing the solenoid valves for various air flow into the front and rear chambers to meet speed requirements.

I claim:

1. In a tow vehicle-trailer braking system, electrical means for generating an operational signal from an actuation signal for the wheel brakes of the tow vehicle to regulate the operation of a servomotor in the trailer which provides an output force to actuate the wheel brakes of the tow vehicle, said electrical means comprising:
    first transducer means for converting said actuation signal for the wheel brakes of the tow vehicle into a corresponding first electrical signal;
    weight simulation means for modifying the effects of the actuation signal in response to a change in the mass of the trailer to maintain optimum braking between the tow vehicle and the trailer;
    adjustable means for altering the effective operating range of the first electrical signal to establish a time limit between actuation of the wheel brakes of the tow vehicle and the trailer;
    transistor means connected to said first transducer means for amplifying said first electrical signal;
    dampening means for uniformly suppressing said electrical signal upon termination of the actuation signal to correspondingly inhibit actuation of the wheel brakes of the trailer;
    solenoid means connected to said transistor means for controlling the flow of a first fluid and a second fluid in response to the amplified electrical signal to create a pressure differential in the servomotor and sequentially actuate the wheel brakes of the trailer with the tow vehicle; and
    holding means responsive to an operator for generating a first switching signal to continually actuate the wheel brakes of the trailer independent of said actuation signal for the wheel brakes of the tow vehicle.

2. The tow vehicle-trailer braking system, as recited in claim 1, wherein said electrical means further includes:
    snubbing means responsive to an operator for generating a second switching signal to intermittently actuate the wheel brakes of the trailer independent of said actuation signal for the wheel brakes of the tow vehicle.

3. The tow vehicle-trailer braking system, as recited in claim 1, wherein said electrical means further includes:
    sensor means located in said trailer for determining any adverse sway therein, said sensors generating a second switching signal to automatically actuate the wheel brakes of the trailer independent of said actuation signal for the wheel brakes of the tow vehicle.

4. The tow vehicle-trailer braking system, as recited in claim 1, wherein said solenoid means includes:
    valve means sequentially moved by energization of coil means in the solenoid means to initially interrupt simultaneous communication of the first fluid across a wall in the servomotor and subsequently regulate the communication of the second fluid to one side of the wall and create said pressure differential.

5. The tow vehicle-trailer braking system, as recited in claim 1, wherein said electrical means further includes:
    second transducer means for converting the actuation signal for the wheel brakes of the trailer into a second electrical signal; and
    comparator means connected to the first transducer and the second transducer for determining the relationship between the first electrical signal and the second electrical signal to provide a corrective signal to the solenoid means to maintain a sequential operation between the wheel brakes of the tow vehicle and the trailer brakes.

6. The tow vehicle-trailer braking system, as recited in claim 5, wherein said solenoid means includes:
    a source of electrical energy maintained at a predetermined level through a connection with the tow vehicle;
    a first contact connected to said source of electrical energy;
    a second contact connected to said coil means of the solenoid means; and
    separator means attached to said tow vehicle and located between said first and second contacts, said first and second contacts engaging each other upon removal of the separator means to generate a fourth switching signal to automatically actuate the trailer brakes independent of said actuation signal for the wheel brakes of the tow vehicle.

* * * * *